(12) United States Patent
Bibikar et al.

(10) Patent No.: US 10,754,413 B2
(45) Date of Patent: Aug. 25, 2020

(54) MECHANISM TO ENTER OR EXIT RETENTION LEVEL VOLTAGE WHILE A SYSTEM-ON-A-CHIP IS IN LOW POWER MODE

(71) Applicant: Intel Corporation, Santa Clara, CA (US)

(72) Inventors: Vasudev Bibikar, Austin, TX (US); Aswin Ramachandran, Austin, TX (US); Chin Seng Lu, Penang (MY); Moorthy Rajesh, Folsom, CA (US); Darren S. Crews, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 15/721,772

(22) Filed: Sep. 30, 2017

(65) Prior Publication Data

US 2019/0101972 A1    Apr. 4, 2019

(51) Int. Cl.
*G06F 1/32* (2019.01)
*G06F 1/26* (2006.01)
*G06F 1/3228* (2019.01)
*G06F 1/3296* (2019.01)
*G06F 1/3234* (2019.01)
*G06F 1/3287* (2019.01)
*G06F 9/30* (2018.01)

(52) U.S. Cl.
CPC .......... *G06F 1/3228* (2013.01); *G06F 1/3243* (2013.01); *G06F 1/3287* (2013.01); *G06F 1/3296* (2013.01); *G06F 9/30181* (2013.01)

(58) Field of Classification Search
CPC ............. G06F 11/3228; G06F 11/3243; G06F 11/3287; G06F 1/26; G06F 1/32

USPC .......................................................... 713/300
See application file for complete search history.

(56) References Cited

U.S. PATENT DOCUMENTS

| | | | |
|---|---|---|---|
| 6,510,525 B1* | 1/2003 | Nookala | G06F 1/3203 713/320 |
| 2011/0022859 A1* | 1/2011 | More | G06F 1/3203 713/300 |
| 2013/0188436 A1 | 7/2013 | Thyagarajan et al. | |
| 2014/0002132 A1 | 1/2014 | Jarrar et al. | |
| 2014/0120832 A1 | 5/2014 | Confer et al. | |
| 2017/0153680 A1 | 6/2017 | Girard et al. | |
| 2018/0067539 A1* | 3/2018 | Samson | G06F 1/3287 |
| 2019/0064910 A1* | 2/2019 | Wang | G06F 1/3206 |

OTHER PUBLICATIONS

International Search report and Written Opinion for Application No. PCT/US2018/053649, dated Jan. 25, 2019, 8 pages.

* cited by examiner

*Primary Examiner* — Phil K Nguyen
(74) *Attorney, Agent, or Firm* — Alliance IP, LLC (57) ABSTRACT

A computing device, system and method. The computing device includes a memory storing instructions, and a processing circuitry coupled to the memory. The processing circuitry is configured to execute the instructions to process a first control signal and a second control signal from respective first and second control pins of a computing platform. The processing circuitry is further to transition the computing platform, based on a combination of the first control signal and the second control signal and using at least one voltage pin on the platform, between a low power state and a retention power state without transitioning to an operational power state in between.

25 Claims, 6 Drawing Sheets

MECHANISM TO ENTER OR EXIT RETENTION LEVEL VOLTAGE WHILE A SYSTEM-ON-A-CHIP IS IN LOW POWER MODE

TECHNICAL FIELD

Embodiments described herein generally relate to power management relating to a System-on-a-Chip.

BACKGROUND

Advances in semiconductor processing and logic design have permitted an increase in the amount of logic that may be present on integrated circuit devices. As a result, computer system configurations have evolved from single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. There is a need for energy efficiency and conservation associated with integrated circuits. These needs will increase integrated systems such as those on wearable devices become even more prevalent.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of actions, the order of such actions as presented herein is not necessarily the only order in which such actions may be performed, and certain of the stated actions may possibly be omitted and/or certain other actions not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems such as wearable. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, wearables, IoT devices, to name just a few.

Embodiments may be implemented in terminals such as wearable devices, mobile phones, smartphones and phablets, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Various use cases or Key Performance Indicators (KPI's) in battery operated market segments, including wearables, phones, certain sensors, etc., typically have an aggressive power target. These aggressive-power-target use cases typically include small form factor devices (such as wearables) that must retain their battery power for long periods of time. Customers tend to compare the power performance (e.g. how fast a system may run out of battery power) of an aggressive-power-target use case SoC with the power performance of an SoC on a computing platform that includes, in addition to the SoC, discrete functional blocks that can serve to fulfill KPI requirements while the SoC is in a retention power state. For the aggressive-power-target use case SoC, it is the functional blocks on the SoC proper that are to provide the functionalities for fulfilling KPI requirements, and, as a result, it is difficult for the SoC to go to a retention power state where some of its functional blocks must still draw power to fulfill KPIs. Therefore, to the extent that customers compare the power performance of an SoC on a platform that includes the discrete functional blocks noted above on the one hand with an SoC on a small form factor device such as a wearable on the other hand creates a challenge to provide power management functionality with respect to the latter SoC that elevates its power performance to be on par with that of the former SoC.

An example of an always-on-always-connected (AOAC) SoC functionality on an aggressive-power-target device may include a Wake-on-Voice functionality which requires a circuit block of the SoC to be always listening and looking for a key phrase. Another example includes a pedometer-like functionality which requires the SoC to constantly poll external sensors. KPIs related to such AOAC functionalities may be achieved in a retention power state of an SoC. A retention power state of the SoC corresponds to an absolute minimum value of the voltage applied to the SoC to allow it to continue operation its AOAC circuit blocks. AOAC use cases may benefit from toggling between a retention level power state or voltage (Vretention), and a low power state or voltage (Vmin) where the voltage supplied to the SoC is higher than Vretention but lower than its operational power state, or operating voltage VNN where the SoC circuit blocks are fully awake and operational.

Existing SoCs on platforms with aggressive-power-target use cases have a mechanism to send control signals to an external Power Management Integrated Circuit (PMIC) (and by external PMIC we mean a PMIC distinct from the SoC) to let the PMIC know when to control voltage to the SoC to have the SoC enter/exit its low power mode, but do not have a mechanism to allow the SoC to transition between the low power state and the retention power state without waking up the SoC in the interim to the operational power state, that is, without coming out of the lowered power states. By "lowered power states," what is meant is all power states below VNN, including the low power state and the retention power state mentioned above.

As will be referred to below, a S0 power state for an SoC corresponds to the SoC having its logic rails on and being at an operational voltage, with the logic being active or clock gated or power gated. A S0i1 power state for an SoC corresponds to the VNN rail (operational voltage rail) being OFF as controlled by the PMIC, and VNNAON rail (lowered power rail) being ON at Vmin level as controlled by the PMIC. At S0i1, a small portion of the logic may be on, with VNNAON active or clock gated or power gated. In addition, a S0i3 power state for an SoC corresponds to the VNN rail being OFF as controlled by the PMIC, with the VNNAON rail being on at a Vretention level. Only a small portion of the logic is retained as being on and a maximum frequency may for example be 32 kHz. Here, the logic can retain active state, but no signal wiggling may occur, and all clocks other than the 32 kHz clock may be off.

Figure 1:
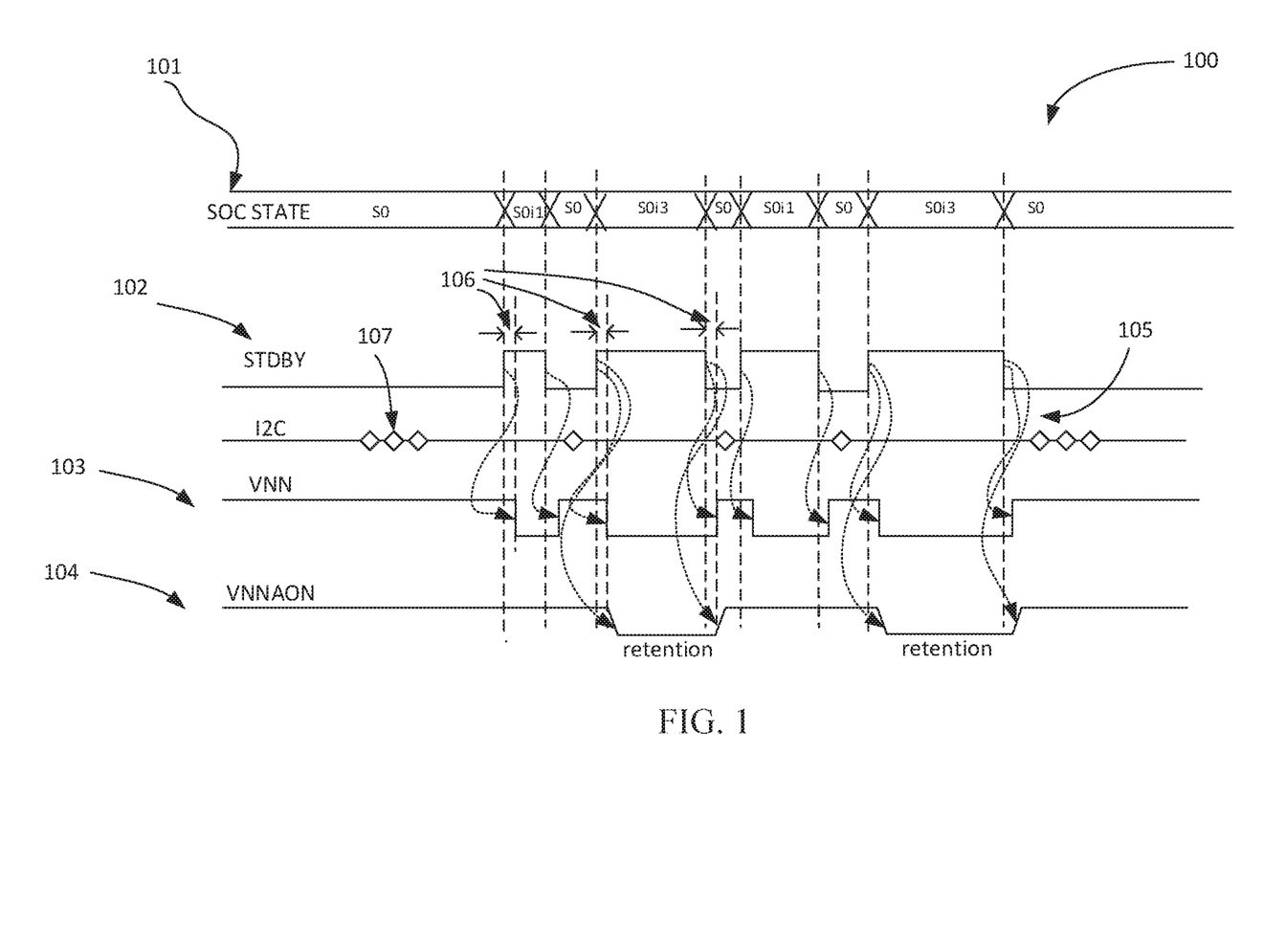
FIG. 1 is a plot of control signal logic states of control signals at a Standby (STDBY) pin on the SoC of FIG. 1 to move the SoC between a low power state and a retention state according to the prior art.

FIG. 1 is a plot 100 of control signal logic states of control signals at a Standby (STDBY) pin on an AOAC-type System-on-a-Chip according to the prior art. FIG. 1 shows the time domain in the horizontal direction, with the power states of the SoC shown in the top power states band 101, with the control signal logic states of control signals at the STDBY pin, and with the voltage states at the operating power state voltage pin VNN 103 and lowered power state voltage pin VNNAON 104 of the prior art SoC. By a "control signal logic state," what is meant is a logic state of the control signal, that is, the logic state that the control signal is indicating to the recipient of the control signal. The logic state for example may be an ON state or an OFF state. As seen in the example prior art plot of FIG. 1, control signals emanating from the STDBY pin of the SoC move or transition, as seen on control signal logic states line 102, between an OFF logic state (lower portions of the line) and an ON logic state (higher portion of the line). The transitioning of the control signal logic states of the STDBY pin correspond with power states of the SoC as shown on band 101. An OFF logic state of the STDBY pin corresponds to an operating power state of the SoC, or S0, whereas an ON logic state of the STDBY pin corresponds to lowered power states of the SoC, including the low power state S0i1 and a retention power state S0i3. As seen in FIG. 1, a transition in the control signal logic state between the operating power state S0, the low power state S0i1 and the retention power state S0i3 is brought about in each case by a control signal from the STDBY pin that transitions between an OFF state (S0) to an ON state (S0i1 or S0i3). Each logic state of the STDBY pin control signal may be communicated to a controller, such as a PMIC, by way of the STDBY pin. The PMIC may then, as suggested by arrows 105: (1) drive the VNN voltage pin to a lowered power state (either S0i1 or S0i3) as a result of the control signal from the STDBY pin being in an ON logic state; and (2) drive the VNNAON voltage pin to a retention power state (S0i3) or to a low power state (S0i1) as a result of the control signal from the STDBY pin being in an OFF logic state. There may be a lag time, as depicted in FIG. 1 by way of time lag 106, between a time when the control logic state of the STDBY pin transitions, and a time when the VNN or the VNNAON pins respond. The time lag 106 may be brought about by the time required for the control signal from STDBY pin to travel to the PMIC, for the processing time within the PMIC, and for the time required for the voltage transition to be effected on either VNN or VNNAON by the PMIC.

Since there is a single STDBY pin on the SoC of the prior art, the prior art solution communicates a lowered power state definition for the SoC to the PMIC by way of an Inter-integrated Circuit Protocol (I2C) interface, as suggested by line I2C in FIG. 1. As seen in FIG. 1, I2C signals (as shown schematically by way of diamonds) 107 are communicated to the PMIC from the SoC to convey to the PMIC either a low power state Vmin or a retention power state Vretention of the SoC. Use of the I2C protocol however requires a Vmin state of the SoC. As a result, considering that other low power mode KPIs would be effective for the SoC in addition to the I2C interface, the SoC must transition to an operational power state (perform a complete wake to S0) requiring the PMIC to provide back all voltage rails to an operational power state of the SoC.

As seen still in FIG. 1, according to the prior art, in order for the SoC power state to transition to S0i3, a retention power state, the SoC has to wake up to its operating power state S0 in order to allow the I2C interface to communicate with the PMIC. Therefore, prior art solutions for an AOAC-type SoC present a solution with relatively high latency to go in and out of the low power state Vmin and the retention power state Vretention. Having to go back to an operational power state to communicate to the PMIC whether the SoC needs to be in a low power state or a retention power state disadvantageously incurs significant power penalties in many mWatts.

To save power in some of these AOAC use cases, the SoC may need to aggressively transition between the low power state and the retention power state without fully waking up to its operational power state, in this way staying within the bounds of its power performance target while fulfilling its KPIs. The above benefits key SoC KPIs, such as sensor hub KPIs, on-die Wi-Fi/BT/GNSS pings, on-die modem pings, etc., while the SoC is in a lowered power state in a battery operated device.

When the SoC is in a low power state, it will keep certain circuit blocks or portions of circuit blocks such as connectivity, on-die modems, audio and sensor hub circuit blocks in a voltage rail that is left on (for example by way of the VNNAON pin), while the rest of the SoC voltage rails (for example VNN and VSRAM) are shut off to save power. Circuit blocks that need to remain in an on voltage state when the VNN rail is off in turn have a duty cycle of activity and no activity, such that VNNAON is kept at Vmin for activity (a low power state of the SoC), and such that VNNAON is kept at Vretention for no activity. The above is the only way for the SoC power to be low enough to compare against any external discrete KPI solutions. However, the latency to go in and out of the Vmin and Vretention levels is critical and needs to be as low as possible, such as a few microseconds.

Figure 2:
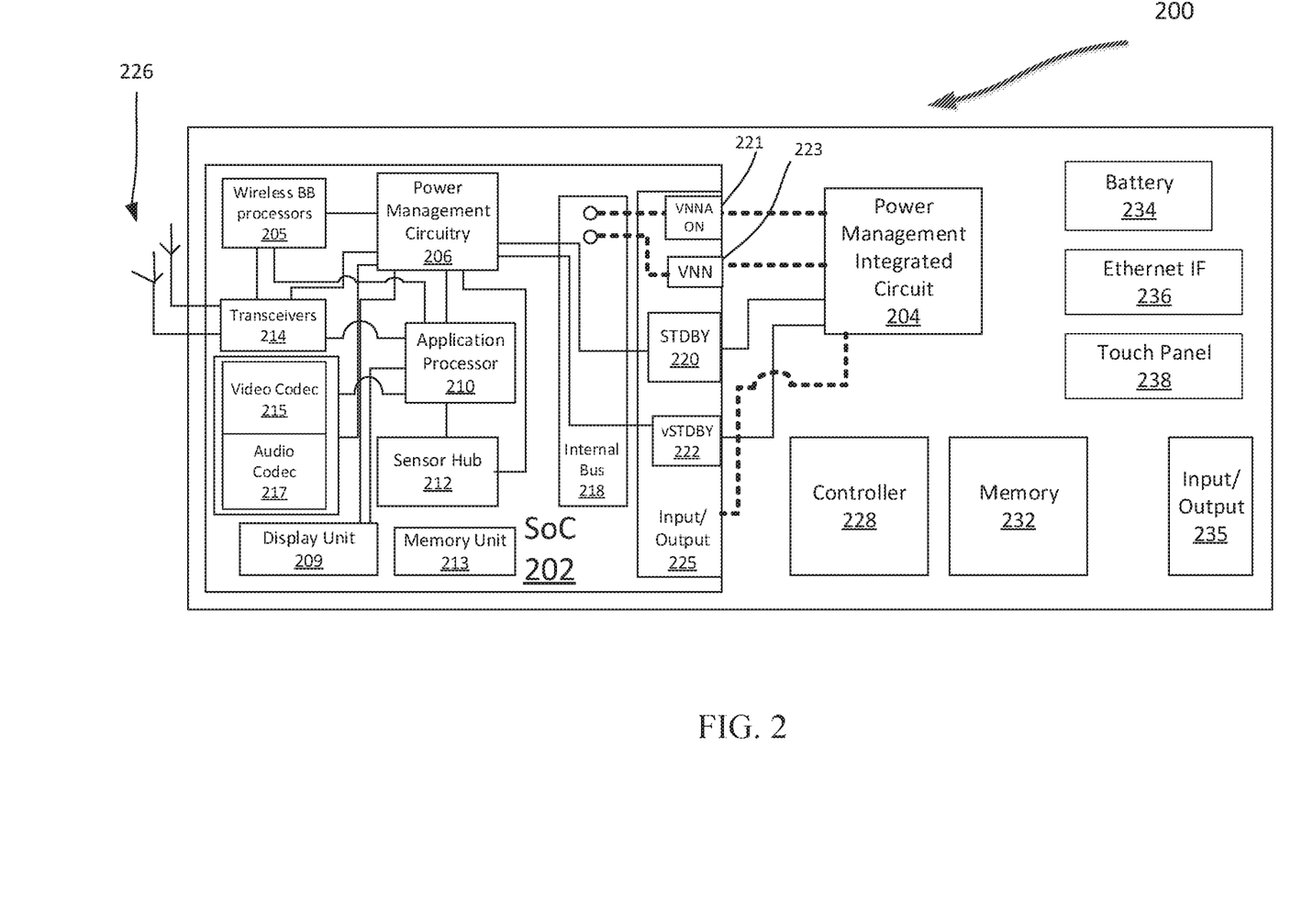
FIG. 2 is a schematic illustration of a hardware device including a SoC coupled to a PMIC according to some demonstrative embodiments.

Some demonstrative embodiments provide a mechanism for a SoC to communicate with a PMIC so that the PMIC can control the SoC voltage between a Vmin level and a Vretention level without moving to operational power state in between. To achieve the above objective, one embodiment contemplates providing, in addition to an existing standby (STBY) pin on the SoC Input/Output interface, a vSTDBY pin. This new vSTDBY pin is to communicate control signals to the PMIC to tell the PMIC that the SoC needs to aggressively transition between Vmin and Vretention power states without entering an operational power state through VNN in between, and while staying in a lowered power state/mode (which includes both Vmin and Vretention and excludes VNN). The vSTDBY pin assertion/deassertion control signals to the PMIC may be handled in power management hardware capable of running at retention level voltage using, for example, 32 KHz Referring now to FIG. 2, a block diagram is shown of a computer system 200 and of components present in a computer system in accordance with an embodiment of the present invention is shown. FIG. 2 may be used to implement any of the operations that will be described further below with respect to embodiments, such as exemplary operations described below in relation to FIGS. 3-5.

System 200 may include any combination of components, some of which are shown by way of example in the figure. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 2 is intended to show a high-level view of many components of the computer system. However, it is to be understood that some of the components shown may be omitted, additional components may be present, and different arrangement of the components shown may occur in other implementations.

By way of example, computer system 200 may be a mobile low-power system such as a wearable device, a low-power sensor, a tablet computer, a phablet or other convertible or standalone system, such as a standalone mobile or non-mobile system.

As seen in FIG. 2, a computer system 200, in one embodiment, may include an SoC 202. In general, SoC 202 may integrate a variety of circuit blocks (e.g., intellectual property/IP blocks) including processing circuitries, into a common package, wherein different circuit blocks may perform different functions. The circuit blocks (such as the various blocks of SoC 202), which may be connected to one or more voltage rails (broken lines in FIG. 2) via Power Management Circuitry (PMC) 206 on the SoC via voltage pins VNN 223 (controlled by the PMIC and used to drive an operational power state) and VNNAON 221 (controlled by the PMIC and used to drive a lowered power state, including a retention power state and a low power state), may be independently placed in various power states in order to improve efficiency and/or reduce power consumption. The transitioning of the circuitry blocks within the SoC 202 between various power states may be effected by way of control signals supplied to the circuitry blocks and travelling through control signal paths, shown by way of connecting lines between the circuitry blocks, in FIG. 2. The control signal paths may include I2C signal paths, or other types of control signal paths as would be recognized by one skilled in the art. The various circuitry blocks on computer system 200 may be functionally interconnected/coupled with one another in a well-known manner.

According to some demonstrative embodiments, some platforms may include a single VNNAON rail, and may include internally derived VNN equivalent rail(s) (i.e. without the use of a VNN pin on the SoC). In such a case, embodiments may allow switching between a Vmin and a Vretention state by controlling voltage input on (VNNAON) rail only.

The circuitry blocks may include a number of processing circuitries, such as a series of wireless baseband processors (BB) 205, a transceiver 214 including front-end module circuitry and radio integrated circuits (not shown) coupled to respective ones of the baseband processors, a video encoder/decoder (video codec) 215, an audio encoder/decoder 217, a display unit 209, a sensor hub 212, an application processor 210, and PMC 206. Each of the processing circuitries may include a microprocessor, multi-core processor, multi-threaded processor, an ultra-low voltage processor, an embedded processor, or other known processing element or circuitry. In the illustrated implementation, SoC 202 may act as a main processing unit and central hub for communication with many of the various components of the system 200. Embodiments however are not limited to an SoC, and include within their scope power regulation and management with respect to any set of processing circuitries, whether on an SoC or discrete.

The SoC may further include display unit 209 which may include a high definition LCD or LED panel. This display panel may also provide for a touch screen functionality. The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

SoC 202 may further include a memory unit 213. SoC may further include one or more flash devices (not shown for sake of simplicity) coupled to one or more of the processors, e.g., via a serial peripheral interface (SPI). Flash devices may provide for non-volatile storage of system software, including a basic input/output software (BIOS) as well as other firmware of the system. Memory unit 213 on SoC 202, and memory 232 on the computing system 200, may each be implemented via multiple memory devices or modules to provide for a given amount of system memory. In one embodiment, one or more of memory unit 213 or memory 232 may be operable in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations, the individual memory devices may be of different package types such as single die package (SDP), dual die package (DDP) or quad die package (QDP). Other memory implementations are possible such as other types of memory modules, e.g., dual inline memory modules (DIMMs) of different varieties including but not limited to microDIMMs, MiniDIMMs. In one embodiment, one or more of memory unit 213 or memory 232 may be sized between 2 GB and 16 GB, and may be configured as a DDR3LM package or an LPDDR2 or LPDDR3 memory. Memory unit 213 may be configured as a mass storage such as a hard disk drive (HDD) or a Solid State Drive (SSD). Memories 213 and 232 may further include a volatile memory.

SoC 202 may further include wireless connectivity circuitry by way of the wireless BB 205, transceivers 214 and antennas 226, each of which can correspond to a particular wireless communication protocol, such as the Near Field Communication (NFC), Wi-Fi, or the Bluetooth (BT) standard. In addition, wireless BB 205, transceiver 214 and antennas 226 may provide wireless wide area communications, e.g., according to a cellular or other wireless wide area protocol.

For perceptual computing and other purposes, various sensors may be present as part of the SoC, as represented by sensor hub 212. Sensor hub 212 may include certain inertial and environmental sensors and their interconnection to application processor 210 and PMC 206 as shown. These sensors may include an accelerometer, an ambient light sensor (ALS), a compass, a gyroscope and a thermal sensor to name just a few. Using the various inertial and environmental sensors present as part of the SoC or otherwise on computer system 200, many allow the realization of different use cases. These use cases enable advanced computing operations including perceptual computing and also allow for enhancements with regard to power management/battery life, security, and system responsiveness.

SoC 202 may further include PMC 206, which may be implemented in hardware, software and/or firmware, and which may be operable to provide voltage regulation and power management within the various circuit blocks of SoC 202. PMC 206 may for example be coupled to STDBY pin 220 and vSTDBY pin 222 to receive and process or forward control signals from the PMIC to transition power states within one or more of the circuit blocks of SoC 202, as will be explained in further detail in relation to FIGS. 3-6.

SoC 202 may further include an internal bus 218 to allow a routing of the control connections shown by way of connecting lines in FIG. 2. The connecting lines depicted in SoC 202 are schematic illustrations of some exemplary control signal paths within the computer system 200, other configurations and further control signal paths being within the knowledge of a skilled person. Control signal paths may include I2C interconnects to carry control signals to and from various processing circuitries.

Various input/output (I/O) devices shown by way of block 225 on the SoC 202, may further be present, including, by way of example, power pins, control pins, and other pins, as would be recognized by one skilled in the art. Among the I/O components of SoC 202, a STDBY pin 220 and a vSTDBY pin 222 are provided among pins to receive and send control signals. For example, STDBY pin 220 and vSTDBY pin 222 may receive control signals from Power Management Integrated Circuit (PMIC) 204 of computer system 200, and may send those control signals onto the PMC 206 of SoC 202 in order to cause a change a power state of the SoC between various possible power states, in manner that will be described further below with respect to some demonstrative embodiments. Although PMIC 204 is shown in FIG. 1 as being external to the SoC 202, embodiments include within their scope the provision of a PMIC or of an on-die regulator with functionality similar to the PMIC on the SoC 202 itself, where the on-die regulator would in this case be regulating the VNN and/or VNNAON from within the SoC 202.

Referring now to the computer system 200, the system may in turn include a number of various circuitry blocks such as, by way of example, PMIC 204, a battery 234 to power the various circuitry blocks, an Ethernet interface 236, a controller 228, a touch panel 238 to provide display capability and user input via touch, including provision of a virtual keyboard on a display of the touch panel. To provide wired network connectivity, computer system 200 may include an Ethernet interface (IF) 236. A peripheral hub within input/output unit 235 may enable interfacing with various peripheral devices, such as may be coupled to system 200 by any of various ports or other connectors. Any of the circuit blocks of computer system 200 may be functionally coupled to any of the circuit blocks of SoC 202 in a well-known manner.

Computer system 200 may include, in addition to internal PMC internal to the SoC, functionality within SoC 202 provided by PMC 206, the PMIC 204. PMIC 204 may be coupled to SoC 202 to provide platform-based power management, e.g., based on whether the system is powered by a battery 234 or AC power via an AC adapter (now shown). In addition to this power source-based power management, PMIC 204 may further perform platform power management activities based on environmental and usage conditions. Still further, PMIC 204 may communicate control and status information to SoC 202 to cause various power management actions within SoC 202. PMIC 204 may include hardware, software and/or firmware to perform power management operations with regard to SoC 202 and with respect to other components of the computer system 200. PMIC 204 may provide control signals to control pins on the SoC 202, such as, in the shown embodiment, to STDBY pin 220 and vSTDBY pin 222, along with other possible pins in order to generate the appropriate regulated voltage within various components of the SoC. The PMIC is configured to effect various power state transitions within SoC 202 in order to save power. During power management, while other power planes may be powered down or off when the processor enters certain deep sleep states, the retention power plane may remain powered on to support certain circuit blocks of the SoC, according to some demonstrative embodiments.

It is to be noted that, although FIG. 2 shows connections between various components of computer system 200 in the form of connecting lines, it is to be understood that the control and voltage connections or rails are for the purpose of showing a mere example of possible connections, and may be effected in any way based on the knowledge of the skilled person in order to achieve the advantages of embodiments described herein. In addition, it is to be understood that, although not shown for ease of reference and description, other rails are present within the computer system 200, including other control rails and pins, voltage rails and pins, and other rails and pins, as would be within the knowledge of the skilled person. While not shown for ease of illustration, understand that additional components may be present within computer system 200, such as one or more independent graphics processors, core logic, uncore logic, and other components such as internal memories, e.g., one or more levels of a cache memory hierarchy and so forth. In addition, as suggested previously, power management according to embodiments is not limited to power management within an SoC, but pertains to power management within any computing platform including a number of circuitry blocks.

Each of PMC 206 and PMIC 204 may include one or more IP (intellectual property) or function blocks. Each IP block may include circuits to perform various functions, such as a logic unit and a memory core. The memory core may include a volatile memory cell that is continuously supplied with a power supply voltage to retain stored data. In some exemplary embodiments, the memory core may include a static random-access memory (SRAM) cell. In other exemplary embodiments, the memory core may include a dynamic random-access memory (DRAM) cell. Each logic unit may further include a peripheral circuit (not shown) for controlling the memory core.

Figure 3:
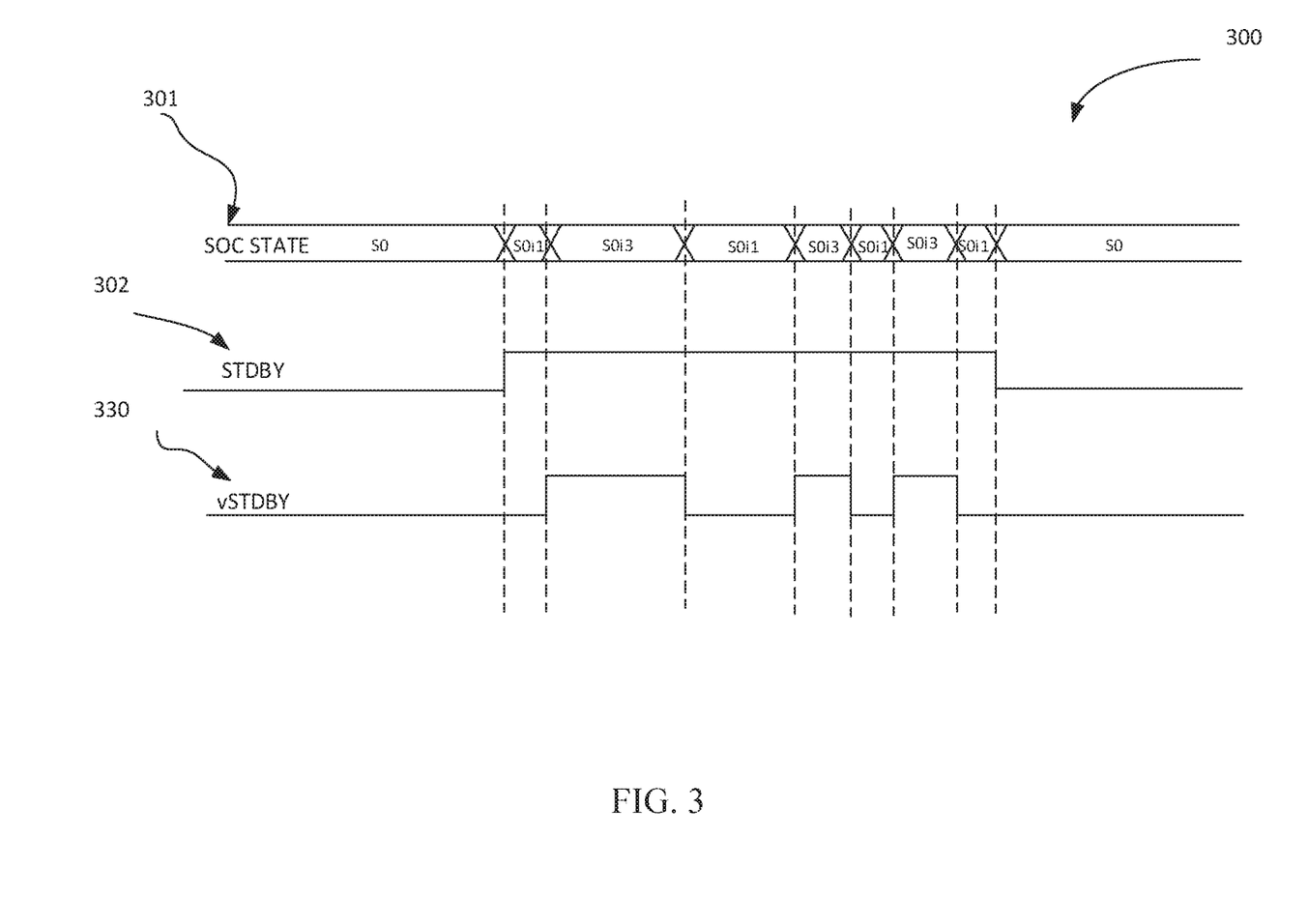
FIG. 3 is a plot similar to FIG. 2, showing plots of control signal logic states of control signals at the STDBY pin and at a vSTDBY pin according to some demonstrative embodiments.

FIG. 3 is a plot similar to FIG. 2, showing plots 300 of control signal logic states of control signals at the STDBY pin and at a vSTDBY pin according to some demonstrative embodiments. Similar to FIG. 1, FIG. 3 shows the time domain in the horizontal direction, with the power states of the SoC shown in the top power states band 301, with the control signal logic states line 302 of control signals at STDBY pin, the control signals logic states line 330 of controls signals at vSTDBY pin. Similar to FIG. 1, the logic state of each control pin STDBY or vSTDBY for example may include an ON state or an OFF state. As seen in the example FIG. 3, control signals emanating from the STDBY pin or the vSTDBY pin of the SoC may move or transition, as seen on control signal logic states line 302 and 330, between an OFF logic state (lower portions of the line) and an ON logic state (higher portion of the line). The transitioning of the control signal logic states of the STDBY pin and of the vSTDBY pin correspond to a transitioning to different power states of the SoC as shown. Here, as compared with the prior art, the additional vSTDBY pin serves to convey whether the lowered power state should correspond to a low power state at Vmin, or to a retention power state at Vretention, as will be explained further below. In this way, an I2C communication will no longer be needed to communicate this information as compared with the prior art (e.g. FIG. 1), and the SoC will not need to move to an operational power state before transitioning between the low power state and the retention power state.

Referring still to FIG. 3, an OFF logic state of the STDBY pin corresponds to an operating power state of the SoC, or S0, whereas an OFF logic state of the STDBY pin corresponds to an operational power state of the SoC at S0, and an ON logic state of the STDBY pin corresponds to a lowered power state of the SoC, including the low power state at Vmin and S0i1 and the retention power state at Vretention and S0i3. As seen in FIG. 1, a transition in the control signal logic state between the operating power state S0 and the lowered power state is brought about in each case by a control signal from the STDBY pin that transitions between an OFF state (S0) to an ON state (S0i1 or S0i3). Each logic state of the STDBY pin control signal may be communicated to a controller, such as a PMIC, by way of the STDBY pin. In addition, a transition in the control signal logic state between the low power state and the retention power state, when the STDBY pin is already at S0, is brought about in each case by a control signal from the vSTDBY pin that transitions between an OFF state (S0 or S0i1) and an ON state (S0i3). A combination of the control signals from the STDBY and the vSTDBY pin may therefore be used by the PMIC to determine whether the SoC needs to be put into a low power state or into a retention power state.

Referring still to FIG. 3, by way of example, while both the STDBY pin and the vSTDBY pin are both in the same logic state of OFF, the SoC may be in a S0 power state. When the STDBY pin is ON and the vSTDBY pin is OFF, the SoC may be in a S0i1 power state, and when both the STDBY pin and the vSTDBY pin are in the same logic state of ON, the SoC may be in a S0i3 power state. As seen in FIG. 3, the STDBY pin may serve as an envelope for the vSTDBY pin, meaning that the vSTDBY pin may only be able to be in an ON state if the STDBY pin is already in an ON state. Therefore, the vSTDBY pin would need to be in an OFF state before the STDBY pin could switch to an OFF state.

After receiving control signals from the STDBY pin and the vSTDBY pin, the PMIC may then: (1) drive the VNN voltage pin to between an operational power state and a lowered power state as a result of the combination of signals from the STDBY pin and vSTDBY pin; and (2) drive the VNNAON voltage pin to a retention power state (S0i3) or to a low power state (S0i1) as a result of the combination of signals from the STDBY pin and vSTDBY pin. There may be a lag time, similar to FIG. 1, between a time when the control logic state of the STDBY pin and the vSTDBY pin transition, and a time when the VNN or the VNNAON pins respond as controlled by the PMIC. The time lag may again be brought about by the time required for the control signal from STDBY pin and vSTDBY pin to travel to the PMIC, for the processing time within the PMIC, and for the time required for the voltage transition to be effected on either VNN or VNNAON by the PMIC.

Advantageously, using a second control pin, such as the vSTDBY pin mentioned above, results in significantly lowered latency for the transitioning of an SoC, such as a AOAC SoC, between a low power state and a retention power state, and further saves significant power by avoiding the need to move into an operational power state for the transitioning, in this way improving the SoC's power performance to make is comparable with the power performance of an SoC on a computing platform that uses discrete KPI solutions.

Figure 4:
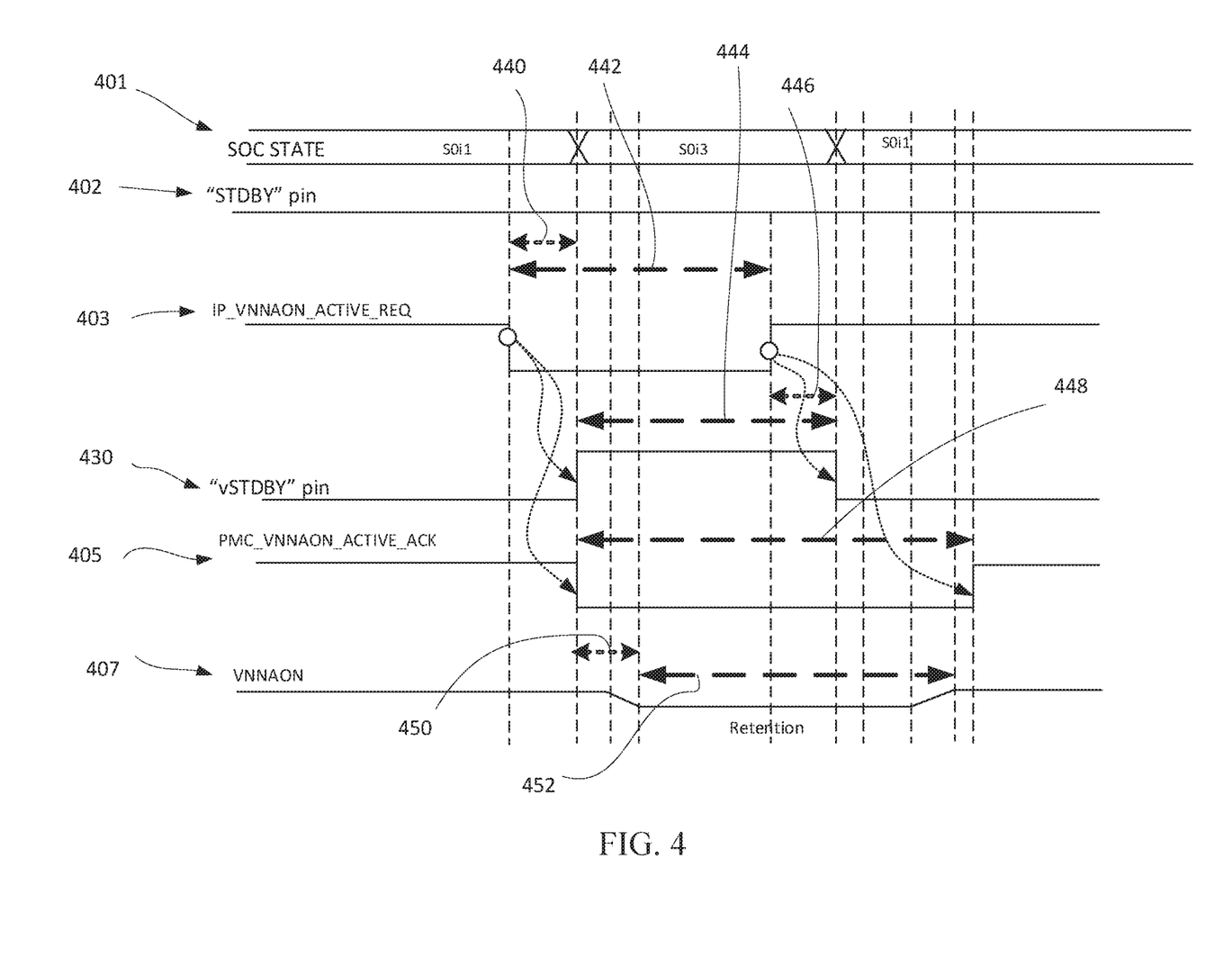
FIG. 4 is a plot showing logic states internal to an SoC to move between a low power state and a retention state.

FIG. 4 is a plot showing logic states internal to an SoC to move between a low power state and a retention state, such as, for example, from the first S0i1 state of FIG. 3, to the first S0i3 state of FIG. 3, and on to the second S0i1 state of FIG. 3, FIG. 4 in essence zooming into a series of power state transitions of FIG. 3. More particularly, FIG. 4 shows logic states for the STDBY pin, for the vSTDBY pin, and for interconnects between the PMC, such as PMC 206 of FIG. 2 and a given circuit block of the SoC such as SoC 202 of FIG. 2. The given circuit block or "retention circuit block" could be any circuit block that would be in a retention state during a retention power state of the SoC, such as, for example, sensor hub 212 of FIG. 2. FIG. 4 also shows a voltage state of the VNNAON pin of the SoC, such as VNNAON 221 of FIG. 2. Similar to FIG. 1, FIG. 3 shows the time domain in the horizontal direction, with the power states of the SoC shown in the top power states band 401, with the control signal logic states of control signals 402 at STDBY pin, the control signals logic states of controls signals at vSTDBY pin 430.

Referring still to FIG. 4, the line 402 showing the control signal logic state for the STDBY pin is flat in an ON state as the SoC would be in a lowered power state transitioning between S0i1 and S0i3. At the time that the retention circuit block would need to go into a retention power state, it may send a control signal of type IP_VNNAON_ACTIVE_REQ 403 to the PMC, by transitioning the control signal logic state of the communication between the retention circuit block and the PMIC from an ON state to an OFF state (during time 442) to request that the PMC control the vSTDBY pin to send a control signal to the PMIC asking the PMIC to switch the VNNAON pin to a retention voltage value. After a lag time 440, the vSTDBY pin control signal logic state goes from an OFF state to an ON state (during time 444) as a result. At the time of the vSTDBY control signal logic state transitioning, the PMC sends a PMC control signal of type PMC_VNNAON_ACTIVE_ACK 405 (by transitioning a logic state of the PMC_VNNAON_ACTIVE from an ON state to an OFF state during time 448) to the retention circuit block to acknowledge the vSTDBY control signal logic state having transitioned into an ON state. After a lag time 450 past the time that the vSTDBY pin control signal logic state transitions to an ON state, the VNNAON voltage pin as controlled by the PMIC goes into a retention state during time 452 as shown by line 407.

At the time that the retention circuit block would need to go into a low power state, it may send a control signal of type IP_VNNAON_ACTIVE_REQ to the PMC, by transitioning the control signal logic state of the communication between the retention circuit block and the PMIC from an OFF state to an ON state (after time 442 has elapsed) to request that the PMC control the vSTDBY pin to send a control signal to the PMIC asking the PMIC to switch the VNNAON pin from a retention voltage value to a low power value as seen by line 407. After a lag time 446, the vSTDBY pin control signal logic state goes from an ON state to an OFF state (after time 444 has elapsed) as a result.

At the time of the vSTDBY control signal logic state transitioning back to an OFF state, the VNNAON pin is still at a retention voltage level. After a lag time, the VNNAON voltage pin switches to a Vmin level, at which time the PMC_VNNAON_ACTIVE_ACK control signal transitions from an OFF state back to an ON state after time 448 has elapsed.

Figure 5:
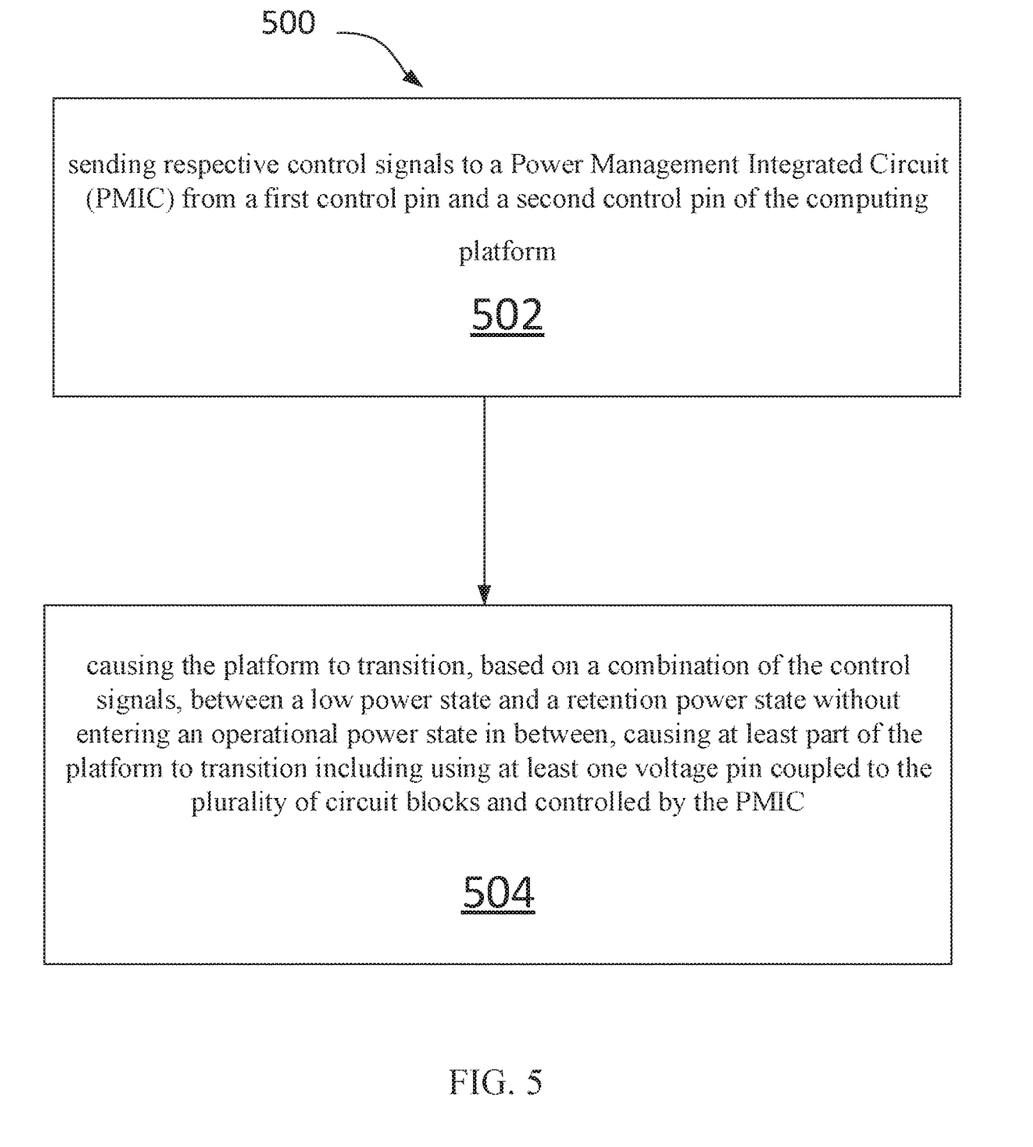
FIG. 5 is a flowchart of a first method according to some demonstrative embodiments.

FIG. 5 is a flowchart of a first method according to some demonstrative embodiments. At operation 502, the method includes sending respective control signals to a Power Management Integrated Circuit (PMIC) from a first control pin and a second control pin of the computing platform. At operation 504, the method includes causing the platform to transition, based on a combination of the control signals, between a low power state and a retention power state without entering an operational power state in between, causing at least part of the platform to transition including using at least one voltage pin coupled to the plurality of circuit blocks and controlled by the PMIC.

Figure 6:
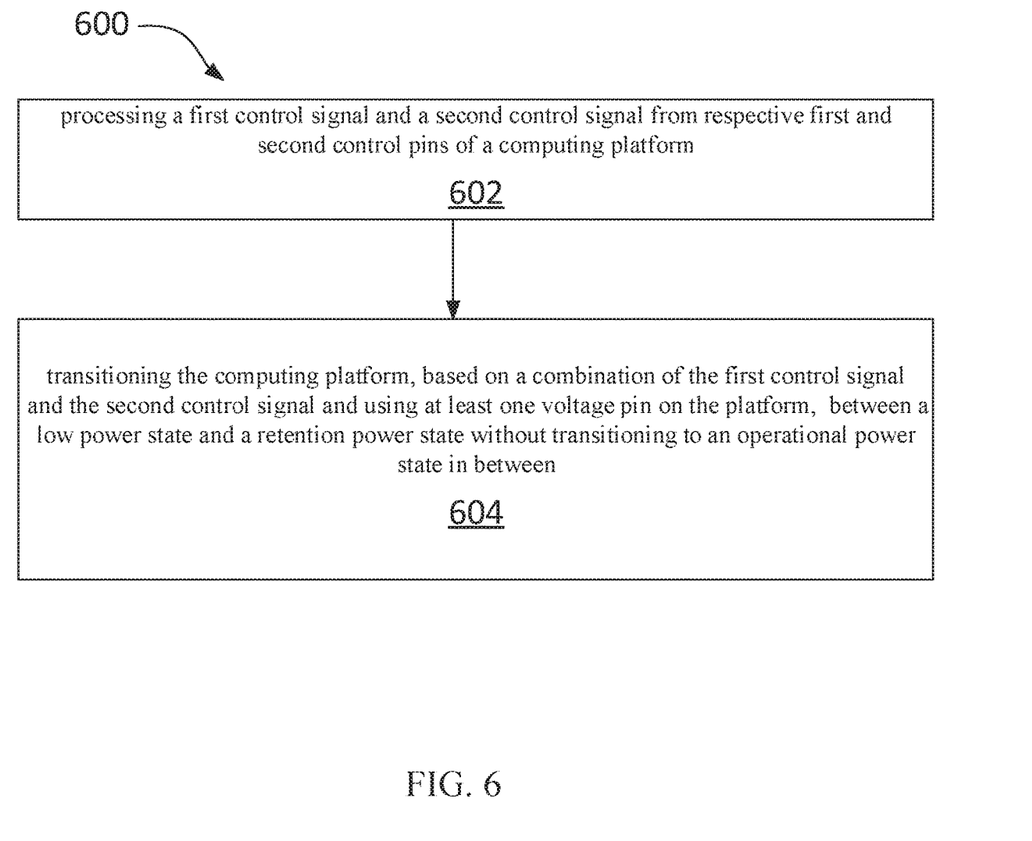
FIG. 6 is a flowchart of a second method according to some demonstrative embodiments.

FIG. 6 is a flowchart of a second method according to some demonstrative embodiments. Operation 602 includes processing a first control signal and a second control signal from respective first and second control pins of a computing platform. Operation 604 includes transitioning the computing platform, based on a combination of the first control signal and the second control signal and using at least one voltage pin on the platform, between a low power state and a retention power state without transitioning to an operational power state in between.

According to some demonstrative embodiments, a computing platform such as SoC 202 or such as computer system 200 of FIG. 2, may include a plurality of circuit blocks, such as any of circuit blocks 204, 206, 209, 210 212, 214, 215, 217 of SoC 202. The computing platform may further include at least one voltage pin, such as voltage pin VNNAON 221 and VNN 223 of FIG. 2, coupled to the plurality of circuit blocks. The voltage pin is to be controlled by a Power Management Integrated Circuit (PMIC), such as PMIC 204 of FIG. 2, and to cause at least part of the platform to transition between an operational power state, a low power state and a retention power state. The computing platform further includes a first control pin, such as STDBY pin 220 of FIG. 2, and a second control pin, such as vSTDBY pin 222 of FIG. 2, the control pins configured to send respective control signals to the PMIC. The PMIC is to control the at least one voltage pin based on a combination of the control signals to cause at least part of the platform to transition between the low power state and a retention power state without transitioning to the operational power state in between.

According to some demonstrative embodiments, a computing device, such as PMIC 204 of FIG. 2, or such as computer system of FIG. 2, includes a memory storing instructions, such as a memory within the PMIC, and a processing circuitry coupled to the memory, the processing circuitry configured to execute the instructions to process a first control signal and a second control signal from respective first and second control pins of a computing platform. The first control pin could, for example, correspond to STDBY pin 220 of FIG. 2, and the second control pin could, for example, correspond to vSTDBY pin 222 of FIG. 2. The processing circuitry is further to transition the computing platform, based on a combination of the first control signal and the second control signal and using at least one voltage pin on the platform, such as voltage pin VNNAON 221 of FIG. 2, between a low power state and a retention power state without transitioning to an operational power state in between.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instruction where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

For example, referring back to FIG. 2, a storage unit or memory within each of the PMC 206 and the PMIC 204, or memory 232, or other memory or combination of memories on system 200, may include a machine readable medium on which is stored one or more sets of data structures or instructions (e.g., software) embodying or utilized by any one or more of the techniques or functions described herein. The instructions may also reside, completely or at least partially, within a main memory, within a static memory, or within a processing circuitry during execution thereof by the machine. In an example, one or any combination of a processing circuitry, a main memory, a static memory, or other storage device may constitute machine-readable media.

Some demonstrative embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the system 200 of FIG. 2 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Functions, operations, components and/or features described herein with reference to one or more embodiments, may be combined with, or may be utilized in combination with, one or more other functions, operations, components and/or features described herein with reference to one or more other embodiments, or vice versa.

EXAMPLES

The following examples pertain to further embodiments.

Example 1 includes a computing platform including: a plurality of circuit blocks; at least one voltage pin coupled to the plurality of circuit blocks and to be controlled by a Power Management Integrated Circuit (PMIC) to cause at least part of the platform to transition between an operational power state, a low power state and a retention power state; and a first control pin and a second control pin configured to send respective control signals to the PMIC, the PMIC to control the at least one voltage pin based on a combination of the control signals to cause at least part of the platform to transition between the low power state and a retention power state without transitioning to the operational power state in between.

Example 2 includes the subject matter of Example 1, and optionally, wherein: each of the respective control signals is to indicate, for a corresponding one of the first control pin and the second control pin, an ON logic state or an OFF logic state; and a same logic state as between the first control pin and the second control pin is to indicate one of the operation power state or the retention power state, and wherein different logic states as between the first control pin and the second control pin are to indicate the retention power state.

Example 3 includes the subject matter of Example 2, and optionally, wherein: an OFF logic state for both the first control pin and the second control pin is to indicate the operational power state, and an ON logic state for both the first control pin and the second control pin is to indicate the retention power state; and an ON logic state for the first control pin and an OFF logic state for the second control pin is to indicate the low power state.

Example 4 includes the subject matter of Example 3, and optionally, wherein an ON logic state for the first control pin serves as an envelope for an ON logic state of the second control pin.

Example 5 includes the subject matter of Example 1, and optionally, wherein the first control pin is a STDBY pin, and the second control pin is a vSTDBY pin.

Example 6 includes the subject matter of Example 1, and optionally, further including a Power Management Circuitry (PMC) coupled to the second control pin, the PMC configured to send a PMC control signal to the second control pin to request the second control pin to change its logic state.

Example 7 includes the subject matter of Example 1, and optionally, wherein the voltage pin includes a VNNAON pin, the VNNAON pin configured to be coupled to a voltage rail of the PMIC.

Example 8 includes the subject matter of Example 1, and optionally, where the computing platform is a System-on-a-Chip.

Example 9 includes the subject matter of any one of Examples 1-8, and optionally, further including the PMIC, wherein the at least one voltage pin, the first control pin and the second control pin are coupled to the PMIC.

Example 10 includes the subject matter of Example 9, and optionally, further including wireless connectivity circuitry.

Example 11 includes a method to be performed at a computing platform that includes a plurality of circuitry blocks, the method including: sending respective control signals to a Power Management Integrated Circuit (PMIC) from a first control pin and a second control pin of the computing platform; and causing the platform to transition, based on a combination of the control signals, between a low power state and a retention power state without entering an operational power state in between, causing at least part of the platform to transition including using at least one voltage pin coupled to the plurality of circuit blocks and controlled by the PMIC.

Example 12 includes the subject matter of Example 11, and optionally, wherein: each of the respective control signals is to indicate, for a corresponding one of the first control pin and the second control pin, an ON logic state or an OFF logic state; and a same logic state as between the first control pin and the second control pin is to indicate one of the operation power state or the retention power state, and wherein different logic states as between the first control pin and the second control pin are to indicate the retention power state.

Example 13 includes the subject matter of Example 12, and optionally, wherein an OFF logic state for both the first control pin and the second control pin is to indicate the operational power state, and an ON logic state for both the first control pin and the second control pin is to indicate the retention power state.

Example 14 includes the subject matter of Example 13, and optionally, wherein an ON logic state for the first control pin and an OFF logic state for the second control pin is to indicate the low power state.

Example 15 includes the subject matter of Example 14, and optionally, wherein an ON logic state for the first control pin serves as an envelope for an ON logic state of the second control pin.

Example 16 includes the subject matter of Example 11, and optionally, wherein the first control pin is a STDBY pin, and the second control pin is a vSTDBY pin.

Example 17 includes the subject matter of Example 11, further including sending a Power Management Circuitry control signal to the second control pin to request the second control pin to change its logic state.

Example 18 includes a product comprising one or more tangible computer-readable non-transitory storage media comprising computer-executable instructions operable to, when executed by at least one computer processor, cause the at least one computer processor to implement operations at a computing platform that includes a plurality of circuitry blocks, the operations comprising: sending respective control signals to a Power Management Integrated Circuit (PMIC) from a first control pin and a second control pin of the computing platform; and causing the platform to transition, based on a combination of the control signals, between a low power state and a retention power state without entering an operational power state in between, causing at least part of the platform to transition including using at least one voltage pin coupled to the plurality of circuit blocks and controlled by the PMIC.

Example 19 includes the subject matter of Example 18, and optionally, wherein each of the respective control signals is to indicate, for a corresponding one of the first control pin and the second control pin, an ON logic state or an OFF logic state; and a same logic state as between the first control pin and the second control pin is to indicate one of the operation power state or the retention power state, and wherein different logic states as between the first control pin and the second control pin are to indicate the retention power state.

Example 20 includes the subject matter of Example 19, and optionally, wherein an OFF logic state for both the first control pin and the second control pin is to indicate the operational power state, and an ON logic state for both the first control pin and the second control pin is to indicate the retention power state.

Example 21 includes the subject matter of Example 20, and optionally, wherein an ON logic state for the first control pin and an OFF logic state for the second control pin is to indicate the low power state.

Example 22 includes the subject matter of Example 21, and optionally, wherein an ON logic state for the first control pin serves as an envelope for an ON logic state of the second control pin.

Example 23 includes the subject matter of Example 18, and optionally, wherein the first control pin is a STDBY pin, and the second control pin is a vSTDBY pin.

Example 24 includes the subject matter of Example 18, and optionally, the operations further including sending a Power Management Circuitry control signal to the second control pin to request the second control pin to change its logic state.

Example 25 includes a computing platform including a plurality of circuit blocks, and further including: means for sending respective control signals to a Power Management Integrated Circuit (PMIC) from a first control pin and a second control pin of the computing platform; and means for causing the platform to transition, based on a combination of the control signals, between a low power state and a retention power state without entering an operational power state in between, causing at least part of the platform to transition including using at least one voltage pin coupled to the plurality of circuit blocks and controlled by the PMIC.

Example 26 includes the subject matter of Example 25, and optionally, wherein: each of the respective control signals is to indicate, for a corresponding one of the first control pin and the second control pin, an ON logic state or an OFF logic state; and a same logic state as between the first control pin and the second control pin is to indicate one of the operation power state or the retention power state, and wherein different logic states as between the first control pin and the second control pin are to indicate the retention power state.

Example 27 includes the subject matter of Example 26, and optionally, wherein an OFF logic state for both the first control pin and the second control pin is to indicate the operational power state, and an ON logic state for both the first control pin and the second control pin is to indicate the retention power state.

Example 28 includes the subject matter of Example 27, and optionally, wherein an ON logic state for the first control pin and an OFF logic state for the second control pin is to indicate the low power state.

Example 29 includes the subject matter of Example 28, and optionally, wherein an ON logic state for the first control pin serves as an envelope for an ON logic state of the second control pin.

Example 30 includes the subject matter of Example 25, and optionally, wherein the first control pin is a STDBY pin, and the second control pin is a vSTDBY pin.

Example 31 includes the subject matter of Example 25, and optionally, further including means for sending a Power Management Circuitry control signal to the second control pin to request the second control pin to change its logic state.

Example 32 includes a computing device including a memory storing instructions, and a processing circuitry coupled to the memory, the processing circuitry configured to execute the instructions to: process a first control signal and a second control signal from respective first and second control pins of a computing platform; and transition the computing platform, based on a combination of the first control signal and the second control signal and using at least one voltage pin on the platform, between a low power state and a retention power state without transitioning to an operational power state in between.

Example 33 includes the subject matter of Example 32, and optionally, wherein: each of the respective control signals is to indicate, for a corresponding one of the first control pin and the second control pin, an ON logic state or an OFF logic state; and a same logic state as between the first control pin and the second control pin is to indicate one of the operation power state or the retention power state, and wherein different logic states as between the first control pin and the second control pin are to indicate the retention power state Example 34 includes the subject matter of Example 33, and optionally, wherein: an OFF logic state for both the first control pin and the second control pin is to indicate the operational power state, and an ON logic state for both the first control pin and the second control pin is to indicate the retention power state; and an ON logic state for the first control pin and an OFF logic state for the second control pin is to indicate the low power state.

Example 35 includes the subject matter of Example 32, and optionally, wherein the processing circuitry is further to transition the computing platform between the operational power state, the low power state and the retention power state by controlling a power supply to at least one voltage pin of the computing platform.

Example 36 includes the subject matter of Example 32, and optionally, wherein the at least one voltage pin includes a VNNAON pin, the processing circuitry to be coupled to the VNNAON pin.

Example 37 includes the subject matter of Example 32, and optionally, where the computing device includes a Power Management Integrated Circuit (PMIC).

Example 38 includes the subject matter of Example 37, and optionally, further including a System-on-a-Chip (SoC), wherein the at least one voltage pin, the first control pin and the second control pin are coupled to the PMIC.

Example 39 includes the subject matter of any one of Examples 32-38, and optionally, wherein further including wireless connectivity circuitry.

Example 40 includes a method to be performed at a computing device, the method comprising: processing a first control signal and a second control signal from respective first and second control pins of a computing platform; and transitioning the computing platform, based on a combination of the first control signal and the second control signal and using at least one voltage pin on the platform, between a low power state and a retention power state without transitioning to an operational power state in between.

Example 41 includes the subject matter of Example 40, and optionally, wherein: an OFF logic state for both the first control pin and the second control pin is to indicate the operational power state, and an ON logic state for both the first control pin and the second control pin is to indicate the retention power state; and a same logic state as between the first control pin and the second control pin is to indicate one of the operation power state or the retention power state, and wherein different logic states as between the first control pin and the second control pin are to indicate the retention power state.

Example 42 includes the subject matter of Example 41, and optionally, wherein: an OFF logic state for both the first control pin and the second control pin is to indicate the operational power state, and an ON logic state for both the first control pin and the second control pin is to indicate the retention power state; and an ON logic state for the first control pin and an OFF logic state for the second control pin is to indicate the low power state.

Example 43 includes the subject matter of Example 40, and optionally, wherein the operations further comprise transitioning the computing platform between the operational power state, the low power state and the retention power state by controlling a power supply to at least one voltage pin of the computing platform.

Example 44 includes the subject matter of Example 40, and optionally, wherein the at least one voltage pin includes a VNNAON pin, the processing circuitry to be coupled to the VNNAON pin.

Example 45 includes the subject matter of Example 40, and optionally, where the computing device includes a Power Management Integrated Circuit (PMIC), and the computing platform includes a System-on-a-Chip (SoC).

Example 46 includes the subject matter of Example 41, and optionally, wherein the at least one voltage pin, the first control pin and the second control pin are part of the SoC and are to be coupled to the PMIC.

Example 47 includes a product comprising one or more tangible computer-readable non-transitory storage media comprising computer-executable instructions operable to, when executed by at least one processing circuitry, cause the at least one processing circuitry to implement operations at a computing device, the operations comprising: processing a first control signal and a second control signal from respective first and second control pins of a computing platform; and transitioning the computing platform, based on a combination of the first control signal and the second control signal and using at least one voltage pin on the platform, between a low power state and a retention power state without transitioning to an operational power state in between.

Example 48 includes the subject matter of Example 47, and optionally, wherein: an OFF logic state for both the first control pin and the second control pin is to indicate the operational power state, and an ON logic state for both the first control pin and the second control pin is to indicate the retention power state; and a same logic state as between the first control pin and the second control pin is to indicate one of the operation power state or the retention power state, and wherein different logic states as between the first control pin and the second control pin are to indicate the retention power state.

Example 49 includes the subject matter of Example 48, and optionally, wherein: an OFF logic state for both the first control pin and the second control pin is to indicate the operational power state, and an ON logic state for both the first control pin and the second control pin is to indicate the retention power state; and an ON logic state for the first control pin and an OFF logic state for the second control pin is to indicate the low power state.

Example 50 includes the subject matter of Example 47, and optionally, wherein the operations further comprise transitioning the computing platform between the operational power state, the low power state and the retention power state by controlling a power supply to at least one voltage pin of the computing platform.

Example 51 includes the subject matter of Example 47, and optionally, wherein the at least one voltage pin includes a VNNAON pin, the processing circuitry to be coupled to the VNNAON pin.

Example 52 includes the subject matter of Example 47, and optionally, where the computing device includes a Power Management Integrated Circuit (PMIC), and the computing platform includes a System-on-a-Chip (SoC).

Example 53 includes the subject matter of Example 48, and optionally, wherein the at least one voltage pin, the first control pin and the second control pin are part of the SoC and are to be coupled to the PMIC.

Example 54 includes a computing device including: means for processing a first control signal and a second control signal from respective first and second control pins of a computing platform; and means for transitioning the computing platform, based on a combination of the first control signal and the second control signal and using at least one voltage pin on the platform, between a low power state and a retention power state without transitioning to an operational power state in between.

Example 55 includes the subject matter of Example 54, and optionally, wherein: an OFF logic state for both the first control pin and the second control pin is to indicate the operational power state, and an ON logic state for both the first control pin and the second control pin is to indicate the retention power state; and an ON logic state for the first control pin and an OFF logic state for the second control pin is to indicate the low power state.

Example 56 includes the subject matter of Example 55, and optionally, wherein: an OFF logic state for both the first control pin and the second control pin is to indicate the operational power state, and an ON logic state for both the first control pin and the second control pin is to indicate the retention power state; and an ON logic state for the first control pin and an OFF logic state for the second control pin is to indicate the low power state.

Example 57 includes the subject matter of Example 54, and optionally, further including means for transitioning the computing platform between the operational power state, the low power state and the retention power state by controlling a power supply to at least one voltage pin of the computing platform.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A computing platform including:
   a plurality of circuit blocks;
   at least one voltage pin coupled to the plurality of circuit blocks and to be controlled by a Power Management Integrated Circuit (PMIC) to cause at least one of the plurality of circuit blocks to transition between an operational power state, a low power state and a retention power state; and
   a first control pin and a second control pin coupled to the at least one of the plurality of circuit blocks and configured to send respective control signals to the PMIC, the PMIC to control the at least one voltage pin based on a combination of the control signals to cause each of the at least one of the plurality of circuit blocks to transition between the low power state and a retention power state without transitioning to the operational power state in between, wherein each of the respective control signals is to indicate, for a corresponding one of the first control pin and the second control pin, an ON logic state or an OFF logic state.

2. The computing platform of claim 1, wherein
   a same logic state as between the first control pin and the second control pin is to indicate one of the operation power state or the retention power state, and wherein different logic states as between the first control pin and the second control pin are to indicate the retention power state.

3. The computing platform of claim 2, wherein:
   an OFF logic state for both the first control pin and the second control pin is to indicate the operational power state, and an ON logic state for both the first control pin and the second control pin is to indicate the retention power state; and
   an ON logic state for the first control pin and an OFF logic state for the second control pin is to indicate the low power state.

4. The computing platform of claim 3, wherein an ON logic state for the first control pin serves as an envelope for an ON logic state of the second control pin.

5. The computing platform of claim 1, wherein the first control pin is a STDBY pin, and the second control pin is a vSTDBY pin.

6. The computing platform of claim 1, further including a Power Management Circuitry (PMC) coupled to the second control pin, the PMC configured to send a PMC control signal to the second control pin to request the second control pin to change its logic state.

7. The computing platform of claim 1, wherein the voltage pin includes a VNNAON pin, the VNNAON pin configured to be coupled to a voltage rail of the PMIC.

8. The computing platform of claim 1, where the computing platform is a System-on-a-Chip.

9. The computing platform of claim 1, further including the PMIC, wherein the at least one voltage pin, the first control pin and the second control pin are coupled to the PMIC.

10. The computing platform of claim 9, further including wireless connectivity circuitry.

11. A product comprising one or more tangible computer-readable non-transitory storage media comprising computer-executable instructions operable to, when executed by at least one computer processor, cause the at least one computer processor to implement operations at a computing platform that includes a plurality of circuitry blocks, the operations comprising:
    sending respective control signals to a Power Management Integrated Circuit (PMIC) from a first control pin and a second control pin of the computing platform; and
    causing at least part of the platform to transition, based on a combination of the control signals, between a low power state and a retention power state without entering an operational power state in between, causing at least part of the platform to transition including using at least one voltage pin coupled to the plurality of circuit blocks and controlled by the PMIC, wherein each of the respective control signals is to indicate, for a corresponding one of the first control pin and the second control pin, an ON logic state or an OFF logic state.

12. The product of claim 11, wherein
    a same logic state as between the first control pin and the second control pin is to indicate one of the operation power state or the retention power state, and wherein different logic states as between the first control pin and the second control pin are to indicate the retention power state.

13. The product of claim 12, wherein an OFF logic state for both the first control pin and the second control pin is to indicate the operational power state, and an ON logic state for both the first control pin and the second control pin is to indicate the retention power state.

14. The product of claim 13, wherein an ON logic state for the first control pin and an OFF logic state for the second control pin is to indicate the low power state.

15. The product of claim 14, wherein an ON logic state for the first control pin serves as an envelope for an ON logic state of the second control pin.

16. The product of claim 11, wherein the first control pin is a STDBY pin, and the second control pin is a vSTDBY pin.

17. The product of claim 11, the operations further including sending a Power Management Circuitry control signal to the second control pin to request the second control pin to change its logic state.

18. A computing platform including a plurality of circuit blocks, and further including:
means for sending respective control signals to a Power Management Integrated Circuit (PMIC) from a first control pin and a second control pin of the computing platform; and
means for causing at least part of the platform to transition, based on a combination of the control signals, between a low power state and a retention power state without entering an operational power state in between, causing at least part of the platform to transition including using at least one voltage pin coupled to the plurality of circuit blocks and controlled by the PMIC, wherein each of the respective control signals is to indicate, for a corresponding one of the first control pin and the second control pin, an ON logic state or an OFF logic state.

19. The computing platform of claim 18, wherein
a same logic state as between the first control pin and the second control pin is to indicate one of the operation power state or the retention power state, and wherein different logic states as between the first control pin and the second control pin are to indicate the retention power state.

20. The computing platform of claim 19, wherein an OFF logic state for both the first control pin and the second control pin is to indicate the operational power state, and an ON logic state for both the first control pin and the second control pin is to indicate the retention power state.

21. The computing platform of claim 20, wherein an ON logic state for the first control pin and an OFF logic state for the second control pin is to indicate the low power state.

22. The computing platform of claim 21, wherein an ON logic state for the first control pin serves as an envelope for an ON logic state of the second control pin.

23. The computing platform of claim 18, wherein the first control pin is a STDBY pin, and the second control pin is a vSTDBY pin.

24. The computing platform of claim 18, further including means for sending a Power Management Circuitry control signal to the second control pin to request the second control pin to change its logic state.

25. The computing platform of claim 18, further including means for providing wireless connectivity.

* * * * *